US011966190B2

(12) United States Patent
Fujiya

(10) Patent No.: US 11,966,190 B2
(45) Date of Patent: Apr. 23, 2024

(54) IMAGE FORMING APPARATUS HAVING CHANNEL SWITCHING DEVICE

(71) Applicant: Hiromitsu Fujiya, Kanagawa (JP)

(72) Inventor: Hiromitsu Fujiya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/052,943

(22) Filed: Nov. 7, 2022

(65) Prior Publication Data

US 2023/0161291 A1 May 25, 2023

(30) Foreign Application Priority Data

Nov. 19, 2021 (JP) ................................ 2021-188831

(51) Int. Cl.

*G03G 21/00* (2006.01)
*G03G 21/12* (2006.01)
*G03G 21/20* (2006.01)
*G03G 15/02* (2006.01)

(52) U.S. Cl.

CPC ........... *G03G 21/12* (2013.01); *G03G 21/206* (2013.01); *G03G 15/0258* (2013.01); *G03G 2221/1624* (2013.01); *G03G 2221/1645* (2013.01)

(58) Field of Classification Search

CPC .... G03G 21/0052; G03G 21/10; G03G 21/12; G03G 21/206; G03G 2221/1645; G03G 2221/1624; B41J 2/1721; B41J 29/377; B41J 2002/1728; B41J 2002/1853; B41J 2002/1856; B65B 1/26; B65B 1/28
USPC ............ 399/92, 93, 358, 360; 141/292, 293
See application file for complete search history.

(56) References Cited

U.S. PATENT DOCUMENTS 10,001,747 B1 * 6/2018 Tamura .............. G03G 15/2017
2010/0129107 A1 5/2010 Takehara et al.
2010/0183323 A1 7/2010 Fujiya et al.
2011/0030927 A1 2/2011 Okano et al.
(Continued)

FOREIGN PATENT DOCUMENTS

JP 2009-282314 12/2009
JP 2013-160843 8/2013
(Continued)

OTHER PUBLICATIONS

Extended European search report dated Mar. 23, 2023, in corresponding European patent Application No. 22207951.9, 7 pages.

*Primary Examiner* — Robert B Beatty
(74) *Attorney, Agent, or Firm* — XSENSUS LLP

(57) ABSTRACT

A channel switching device includes: an accommodation portion in which a unit is detachably accommodated; a first channel; a second channel passing through the accommodation portion; and a switch separating the first channel and the second channel, the switch including: a first communication portion communicating with the first channel and the second channel; and a second communication portion disposed at a different position with the first communication portion, the second communication portion communicating with the first channel and the second channel, and the switch configured to switch to one of the first communication portion or the second communication portion in response to an attachment or detachment of the unit to the accommodation portion.

9 Claims, 12 Drawing Sheets

(56) References Cited

U.S. PATENT DOCUMENTS

| | | | |
|---|---|---|---|
| 2011/0052247 | A1 | 3/2011 | Saitoh et al. |
| 2011/0052248 | A1 | 3/2011 | Nishimura et al. |
| 2011/0052249 | A1 | 3/2011 | Iijima et al. |
| 2011/0103821 | A1* | 5/2011 | Akiyama ............. G03G 21/206 399/93 |
| 2011/0164896 | A1 | 7/2011 | Hirasawa et al. |
| 2011/0170895 | A1 | 7/2011 | Fujiya et al. |
| 2011/0188880 | A1 | 8/2011 | Suzuki et al. |
| 2011/0211859 | A1 | 9/2011 | Shimoyama et al. |
| 2012/0061057 | A1 | 3/2012 | Okano et al. |
| 2012/0070179 | A1 | 3/2012 | Mizuno et al. |
| 2012/0070180 | A1 | 3/2012 | Iijima et al. |
| 2012/0227927 | A1 | 9/2012 | Fujiya et al. |
| 2012/0263491 | A1 | 10/2012 | Fujiya et al. |
| 2012/0315069 | A1 | 12/2012 | Ikeda et al. |
| 2013/0107456 | A1* | 5/2013 | Kitajima .............. G03G 21/206 361/695 |
| 2013/0322915 | A1 | 12/2013 | Takehara et al. |
| 2014/0044462 | A1 | 2/2014 | Ikeda et al. |
| 2014/0060782 | A1 | 3/2014 | Ikeda et al. |
| 2014/0064775 | A1 | 3/2014 | Okano et al. |
| 2014/0093269 | A1 | 4/2014 | Hirasawa et al. |
| 2014/0186080 | A1 | 7/2014 | Ikeda et al. |
| 2014/0186081 | A1 | 7/2014 | Hirasawa et al. |
| 2014/0205303 | A1* | 7/2014 | Maeda ............... G03G 21/1842 399/92 |
| 2014/0219677 | A1 | 8/2014 | Ikeda et al. |
| 2014/0233996 | A1 | 8/2014 | Ikeda et al. |
| 2014/0308058 | A1 | 10/2014 | Ikeda et al. |
| 2015/0023708 | A1* | 1/2015 | Lee ...................... G03G 21/105 399/358 |
| 2015/0071677 | A1 | 3/2015 | Hirasawa et al. |
| 2015/0217586 | A1 | 8/2015 | Ikeda et al. |
| 2015/0227111 | A1 | 8/2015 | Ikeda et al. |
| 2015/0277304 | A1 | 10/2015 | Ikeda et al. |
| 2016/0048106 | A1 | 2/2016 | Hirasawa et al. |
| 2016/0195847 | A1 | 7/2016 | Ikeda et al. |
| 2016/0313693 | A1 | 10/2016 | Fujiya et al. |
| 2016/0342135 | A1 | 11/2016 | Fujiya et al. |
| 2016/0342136 | A1 | 11/2016 | Ikeda et al. |
| 2018/0136602 | A1 | 5/2018 | Hashimura |
| 2018/0164737 | A1* | 6/2018 | Iwasaki .................. G03G 21/12 |
| 2018/0181060 | A1 | 6/2018 | Fujiya et al. |
| 2019/0391518 | A1* | 12/2019 | Iwasaki ................ G03G 15/505 |
| 2020/0050144 | A1 | 2/2020 | Kabata et al. |
| 2020/0363769 | A1* | 11/2020 | Kawabata ............ G03G 21/206 |

FOREIGN PATENT DOCUMENTS

| | | | |
|---|---|---|---|
| JP | 2014-160118 | 9/2014 | |
| JP | 2018-097099 | 6/2018 | |
| JP | 2020-027158 | 2/2020 | |
| JP | 2020091437 A * | 6/2020 | ............ G03G 21/12 |

* cited by examiner

IMAGE FORMING APPARATUS HAVING CHANNEL SWITCHING DEVICE

CROSS-REFERENCE TO RELATED APPLICATIONS

This patent application is based on and claims priority pursuant to 35 U.S.C. § 119(a) to Japanese Patent Application No. 2021-188831, filed on Nov. 19, 2021, in the Japan Patent Office, the entire disclosure of which is hereby incorporated by reference herein.

BACKGROUND

Technical Field

Embodiments of this disclosure relate to a channel switching device, an image forming apparatus, and a liquid discharge apparatus.

Related Art

An image forming apparatus collects scattered toner or ozone generated in a development device or a transfer device. The toner or ozone is suctioned, and the suctioned toner or ozone is separated by a collection device. The separated toner or ozone is recovered in a reservoir, and toner or ozone that cannot be separated is collected by a filter.

SUMMARY

A channel switching device includes: an accommodation portion in which a unit is detachably accommodated; a first channel; a second channel passing through the accommodation portion; and a switch separating the first channel and the second channel, the switch including: a first communication portion communicating with the first channel and the second channel; and a second communication portion disposed at a different position with the first communication portion, the second communication portion communicating with the first channel and the second channel, and the switch configured to switch to one of the first communication portion or the second communication portion in response to an attachment or detachment of the unit to the accommodation portion.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
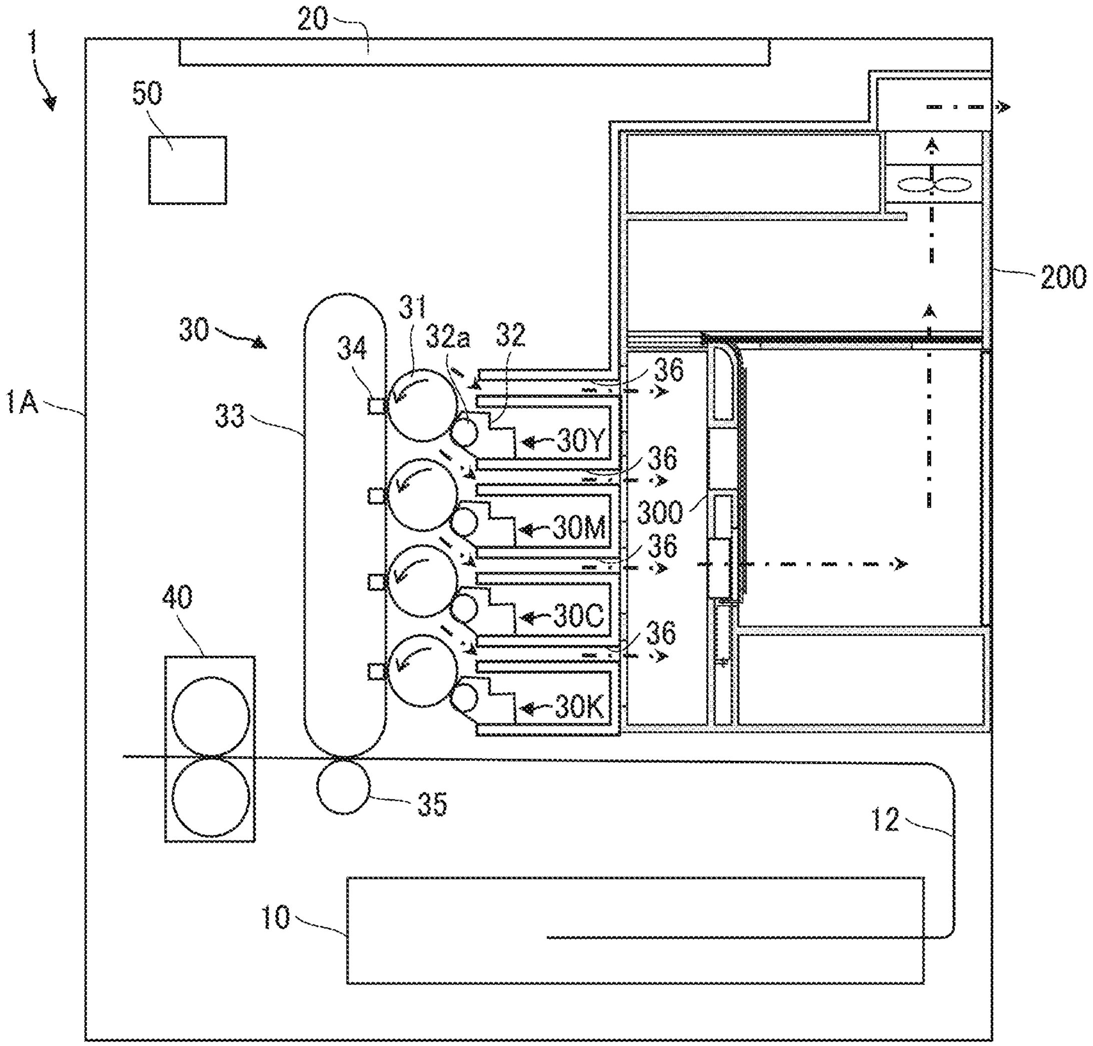
FIG. 1 is a schematic view illustrating a configuration example of an image forming apparatus according to the present embodiment in a state in which a collection unit is detached.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments are described with respect to the drawings. In the drawings for explaining the following embodiments, the same reference codes are allocated to elements, members, or components having the same function or shape and redundant descriptions thereof are omitted below.

Descriptions are hereinafter given of a configuration example of a channel switching device 200 according to the present embodiment and a configuration example of an image forming apparatus 1 in which the channel switching device 200 of the present embodiment is employed. Herein, a case in which a collection unit 100 that collects a predetermined substance such as toner and ozone from the air is used as a unit detachable from the channel switching device 200 is described as one example. The collection unit 100 may also be referred simply as a "unit 100".

The configuration example of the image forming apparatus 1 in which the channel switching device 200 of the present embodiment is employed is described with reference to FIGS. 1 and 2.

FIG. 1 is a schematic view illustrating a configuration example of the image forming apparatus 1 according to the present embodiment in a state in which the collection unit 100 is detached.

Figure 2:
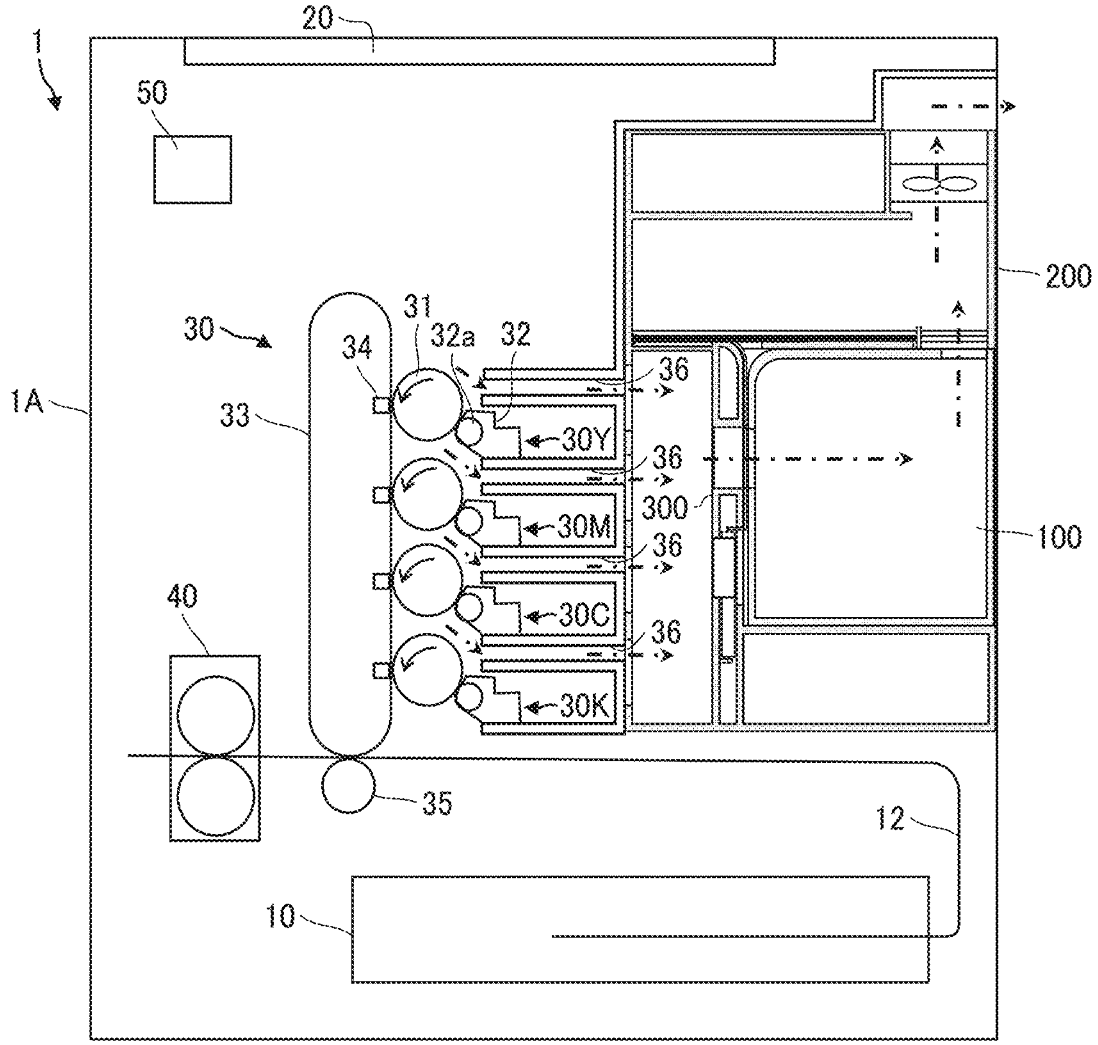
FIG. 2 is a schematic view illustrating a configuration example of the image forming apparatus according to the present embodiment in a state in which the collection unit is attached.

FIG. 2 is a schematic diagram illustrating a configuration example of the image forming apparatus 1 according to the present embodiment in a state in which the collection unit 100 is attached.

The image forming apparatus 1 of the present embodiment forms an image on a sheet by using an electrophotographic method. The image forming apparatus 1 is a tandem color image forming apparatus by which four color toners of yellow (Y), magenta (M), cyan (C), and black (K) are overlapped. Hereinafter, the four color toners are referred to as Y, M, C, and K.

As illustrated in FIGS. 1 and 2, the image forming apparatus 1, for example, includes a substantially cuboid apparatus body 1A that forms an exterior of the image forming apparatus 1. In the apparatus body 1A, a sheet storage 10, an image reader 20, an image forming device 30, a fixing device 40, a controller 50, and the channel switching device 200 are disposed.

The sheet storage 10 is disposed in a lower portion of the image forming apparatus 1. The sheet storage 10 includes a plurality of trays for different sizes of sheets or different types of sheets. A sheet is fed from a tray and then conveyed to a conveyance unit 12, so that the sheet is conveyed to the image forming device 30 and the fixing device 40 by the conveyance unit 12.

The image reader 20 reads an image of a document to generate image data. The image reader 20 also performs various processes such as a correction process and a compression process on the image data generated by analog/digital (A/D) conversion, and stores the resultant image data in a storage unit of the controller 50. The image data is not limited to data to be output from the image reader 20. The image data may be data that is received from a personal computer connected to the image forming apparatus 1 or an external device such as another image forming apparatus.

The image forming device 30 forms an image on a sheet based on an image formation job. The image forming device 30 includes four image forming units 30Y, 30M, 30C, and 30K for the respective color components of Y, M, C, and K, an intermediate transfer belt 33, primary transfer units 34, and a secondary transfer roller 35.

Each of the image forming units 30Y, 30M, 30C, and 30K includes a photoconductor 31 having a drum shape, a development unit 32, a charging unit, an exposure unit, and a cleaning unit. The development unit 32, the charging unit, the exposure unit, and the cleaning unit are disposed around the photoconductor 31.

The charging unit charges a surface of the photoconductor 31, and the exposure unit emits a laser light to the charged surface of the photoconductor 31. Such irradiation of the photoconductor 31 with the light forms an electrostatic latent image on the photoconductor 31. The development unit 32 uses a development roller 32*a* to supply a predetermined color toner (any of Y, M, C, and K) to the photoconductor 31 which has been irradiated with the laser light, thereby developing the electrostatic latent image formed on the photoconductor 31.

The images (single color images) formed with the respective Y, M, C, and K toners on the four photoconductors 31 for Y, M, C, and K are transferred from the photoconductors 31 to the intermediate transfer belt 33. The intermediate transfer belt 33 is an endless belt looped around a plurality of conveyance rollers. The intermediate transfer belt 33 is rotated with rotation of each of the conveyance rollers. On an inner circumferential side of the intermediate transfer belt 33, the primary transfer units 34 are disposed in positions opposite the respective photoconductors 31 of the image forming units 30Y, 30M, 30C, and 30K. The primary transfer unit 34 applies a voltage having a polarity opposite to the toner to the intermediate transfer belt 33, so that the toner adhering to the photoconductor 31 is transferred to the intermediate transfer belt 33.

With the rotation of the intermediate transfer belt 33, the toner images formed by the four image forming units 30Y, 30M, 30C, and 30K are sequentially transferred to a surface of the intermediate transfer belt 33. That is, the toner images having the respective color components of Y, M, C, and K overlap one another to form a color image on the intermediate transfer belt 33.

On an outer circumferential side of the intermediate transfer belt 33, the secondary transfer roller 35 is disposed in a position opposite the intermediate transfer belt 33. A nip portion in which the secondary transfer roller 35 and the intermediate transfer belt 33 contact each other is a transfer position. The secondary transfer roller 35 causes the sheet conveyed by the conveyance unit 12 to contact the intermediate transfer belt 33 to transfer the toner image formed on the outer circumferential surface of the intermediate transfer belt 33 to the sheet.

The fixing device 40 is disposed on a sheet ejection side relative to the secondary transfer roller 35. The fixing device 40 includes a pair of rollers that are a heat roller and a pressure roller. When the sheet passes through a nip portion between the roller pair, heat and pressure are applied to the sheet, so that the toner image transferred to the sheet is fused and fixed. The sheet on which the toner image has been fused and fixed is conveyed to an ejection unit.

In addition, suction ducts 36 are disposed above the respective development units 32 of the four image forming units 30Y, 30M, 30C, and 30K. The suction ducts 36 are ducts through which toner-containing air containing toner scattered in the respective image forming units 30Y, 30M, 30C, and 30K passes.

The air which has passed through the four suction ducts 36 is introduced into the channel switching device 200. In each of FIGS. 1 and 2, a dot-dashed line indicates a flow of the air which passes through the suction duct 36 and is then discharged via the channel switching device 200.

The channel switching device 200 changes a flow of the introduced air depending on whether the collection unit 100 is detached (FIG. 1) or the collection unit 100 is attached (FIG. 2), and discharges the air. The channel switching device 200 includes a switch 300 that includes two communication portions. Assume that a channel through which the introduced air flows to the switch 300 is a first channel, and a channel from the switch 300 to where the air is discharged is a second channel. The switch 300 switches the communication portions to communicate with the first channel and the second channel depending on attachment or detachment of the collection unit 100, thereby changing a flow of the air. The channel switching device 200 is described in detail below.

The controller 50, for example, includes a central processing unit (CPU) and a storage unit such as a random access memory (RAM) and a read only memory (ROM). The CPU of the controller 50, for example, reads various programs stored in the ROM, and loads the programs into the RAM to execute various processes such as an image forming process and a toner collection process based on the loaded program.

In addition, the image forming apparatus 1 includes a storage and an operation display. The storage includes, for example, a hard disk drive (HDD) and a semiconductor non-volatile memory. In the storage, various programs including a system program and a process program to be executed by the controller 50, and data used for execution of such programs are stored. The operation display includes a display screen, a display unit for displaying various information on the screen, and an operation unit that is used by a user to input various instructions.

Figure 3:
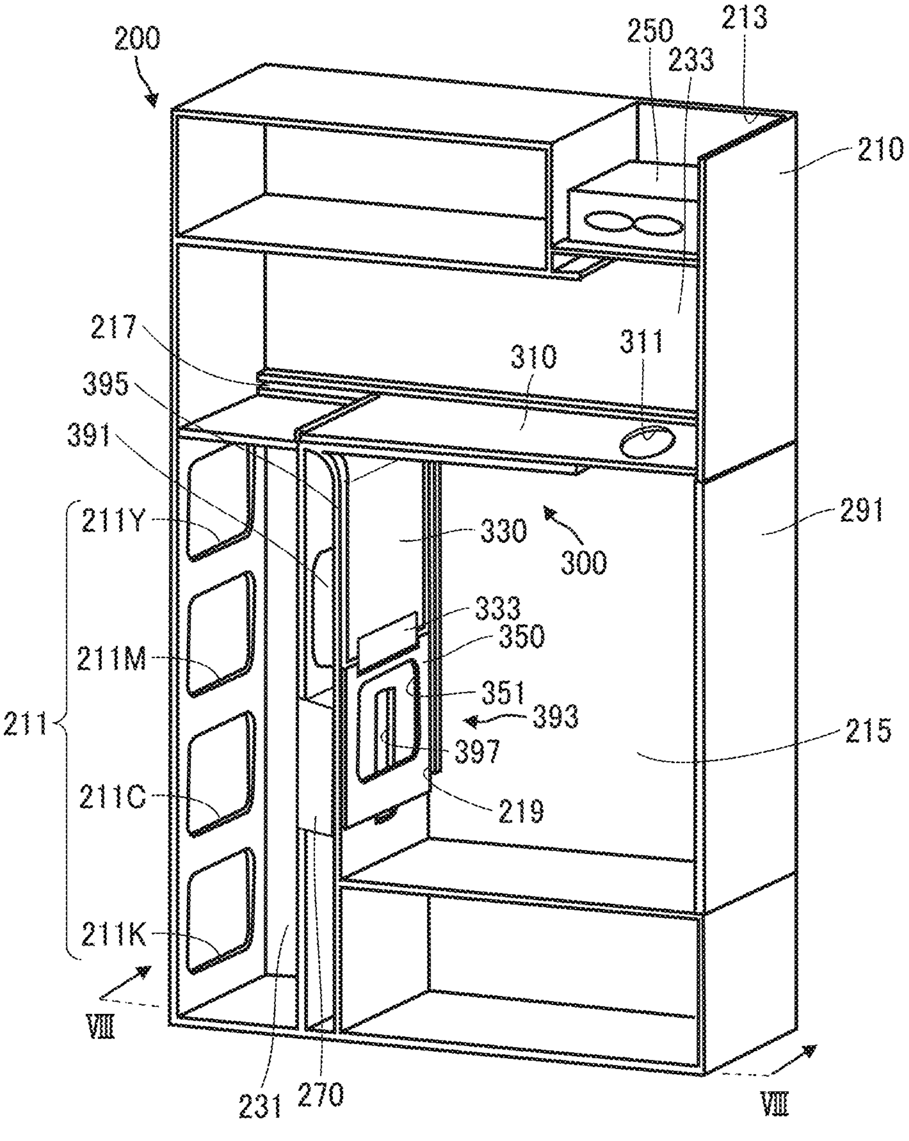
FIG. 3 is a diagram illustrating a configuration example of a channel switching device according to the present embodiment.
Figure 4:
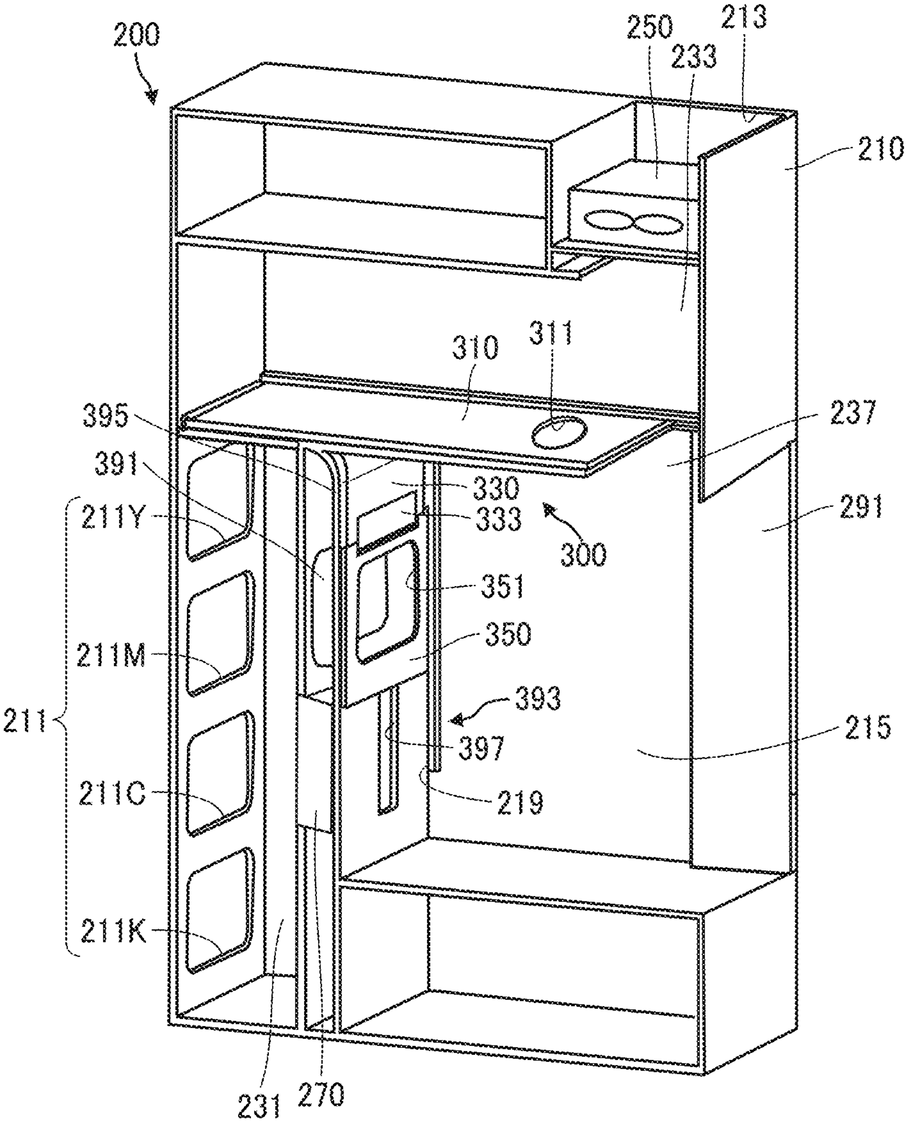
FIG. 4 is a diagram illustrating an example of a state of a switch when the collection unit is attached to the channel switching device illustrated in FIG. 3.

Next, a configuration example of the channel switching device 200 according to the present embodiment is described. FIG. 3 is a diagram illustrating a configuration example of the channel switching device 200 according to the present embodiment. FIG. 3 illustrates an example of a state in which the collection unit 100 is not attached to the channel switching device 200. FIG. 4 is a diagram illustrating an example of a state of the switch 300 when the collection unit is 100 is attached to the channel switching device 200 illustrated in FIG. 3. For the sake of convenience in description, FIG. 4 illustrates an example of a state of the channel switching device 200 excluding the collection unit 100.

The channel switching device 200 includes a case 210 in which an introduction portion 211, an exit 213, an accommodation portion 215, a first duct 231, and a common duct 233 are arranged. Moreover, the channel switching device 200 includes a fan 250, an auxiliary filter 270, a door 291, and the switch 300. In the channel switching device 200, a first channel is a channel that guides the air from the introduction portion 211 to the switch 300, and a second channel is a channel that guides the air from the switch 300 to the exit 213. Thus, the second channel is a channel that passes through the accommodation portion 215. When the collection unit 100 is attached, the second channel is a channel that passes through the accommodation portion 215 via the collection unit 100.

The introduction portion 211 is an opening so that the air is introduced into the apparatus. In FIG. 4, four introduction portions 211Y, 211M, 211C, and 211K are formed for the respective four toners (Y, M, C, and K). Alternatively, the introduction portion 211 may have one opening instead of the four openings. Hereinafter, the four introduction portions 211Y, 211M, 211C, and 211K are referred to as the introduction portion 211 where distinction is not necessary.

The exit 213 is an exit of the air introduced from the introduction portion 211. The accommodation portion 215 is a space that has an opening and in which the collection unit 100 is detachably accommodated. The collection unit 100 is described below with reference to FIG. 7.

The first duct 231 is a duct that forms the first channel which guides the air introduced from the introduction portion 211 to the switch 300. The common duct 233 is a duct that forms a channel (one portion of the second channel) that guides the air which has passed through the accommodation portion 215 to the exit 213 via the fan 250. The common duct 233 and the accommodation portion 215 form a portion of the second channel.

The fan 250 is one example of an air blower that generates a flow of the air from the introduction portion 211 to the exit 213, and is disposed near the exit 213.

The auxiliary filter 270 is one example of an auxiliary unit that supplements a process that is executed by the collection unit 100, instead of the collection unit 100. The auxiliary filter 270 may be configured such that the auxiliary filter 270 can be replaced or cleaned when the channel switching device 200 is cleaned.

The door 291 is attached to the case 210 with upper and lower hinges, and is opened or closed depending on attachment or detachment of the collection unit 100. The door 291 is closed when the collection unit 100 is detached, so that the door 291 serves as an external wall of the channel switching device 200. On the other hand, when the collection unit 100 is attached, the door 291 is opened with insertion of the collection unit 100 and is sandwiched between the case 210 and the collection unit 100. The door 29 closes (blocks) the accommodation portion 215 in response to the detachment of the collection unit 100 from the accommodation portion 215.

Figure 6B:
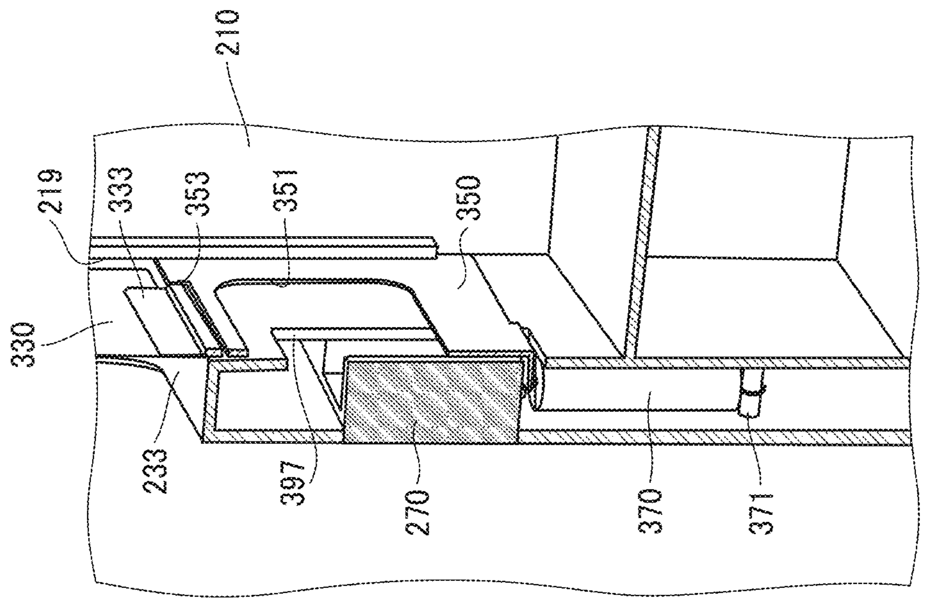
FIGS. 6A and 6B are sectional views respectively illustrating an example of the periphery of a second communication portion in a state in which an auxiliary filter is detached, and an example of the periphery of the second communication portion in a state in which the auxiliary filter is attached.
Figure 6A:
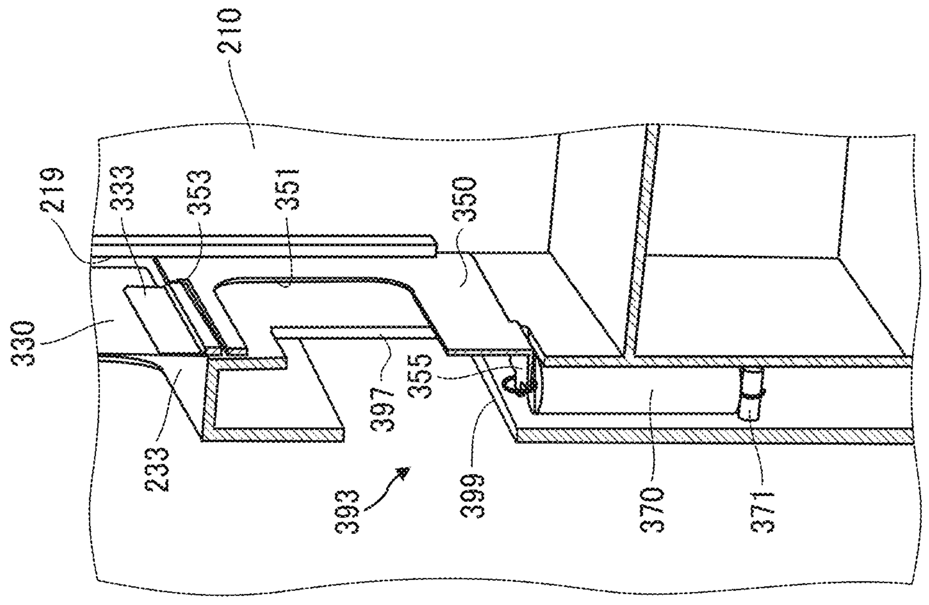

The switch 300 includes a first communication portion 391 and a second communication portion 393 as two communication portions communicating with the first channel and the second channel. The switch 300 switches the communication portions to communicate with the first channel and the second channel, depending on attachment or detachment of the collection unit 100. The switch 300 also includes a slide plate 310, a flexible shutter 330, an open-close shutter 350, and a tensile unit 370 that is illustrated in FIGS. 6A and 6B.

Figure 5:
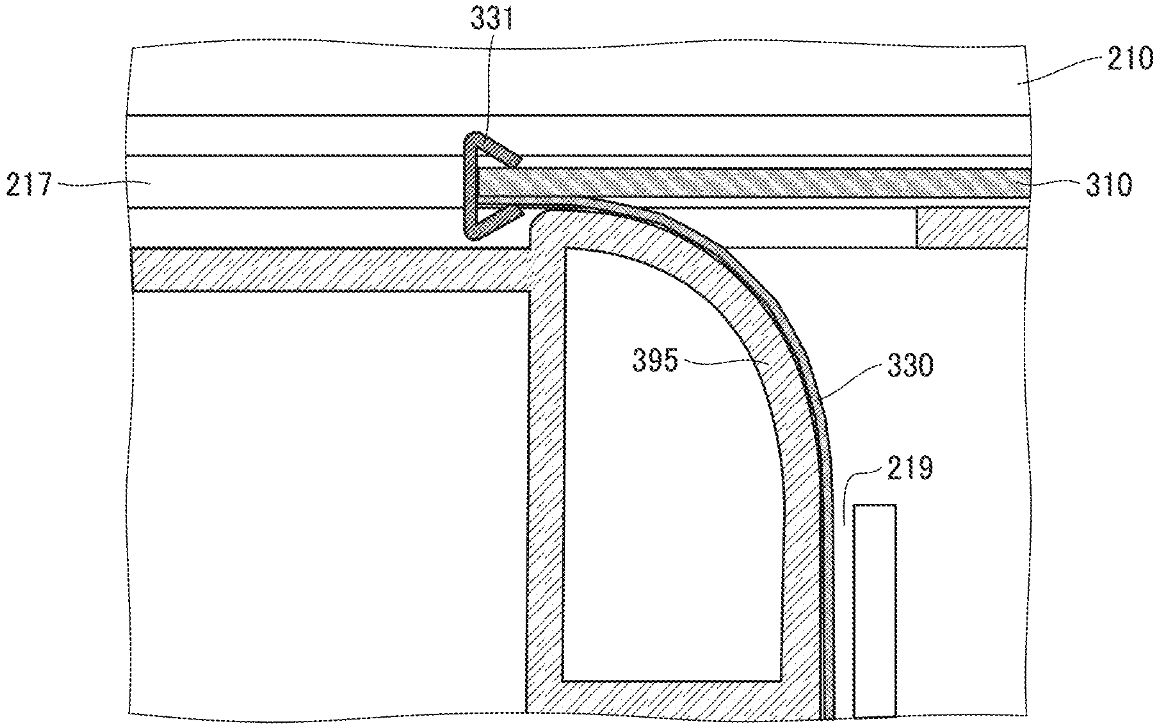
FIG. 5 is a sectional view illustrating a connection relation between a slide plate and a flexible shutter.

FIG. 5 is a sectional view illustrating a connection relation between the slide plate 310 and the flexible shutter 330. FIGS. 6A and 6B are sectional views of the periphery of the second communication portion 393. FIG. 6A illustrates an example of a state in which the auxiliary filter 270 is detached, whereas FIG. 6B illustrates an example of a state in which the auxiliary filter 270 is attached. Each of FIGS. 6A and 6B is a view in which the periphery of the second communication portion 393 illustrated in FIG. 3 is enlarged. The switch 300 is described in detail with reference to FIGS. 3 through 6B.

The slide plate 310 is a rectangular plate that slides depending on attachment or detachment of the collection unit 100. The case 210 has a groove 217, and the slide plate 310 is fitted into the groove 217. Thus, the slide plate 310 is slidable along the groove 217. In addition, the slide plate 310 has a hole 311 through which the air passes.

The flexible shutter 330 is a shutter made of a material (e.g., MYLAR®) that not only has flexibility but also is impervious to gas. As illustrated in FIG. 5, the flexible shutter 330 is attached so as to be held by a spring clip 331 at an end portion of the slide plate 310. The case 210 includes a guide wall 395, and the flexible shutter 330 is attached along the guide wall 395.

The open-close shutter 350 has an opening 351. The opening 351 communicates with the first communication portion 391 in a case where a channel is switched to the first channel. The open-close shutter 350 has a hole 353 near the flexible shutter 330. An end portion of the flexible shutter 330 is folded back through the hole 353 of the shutter 350 and attached to a body of the flexible shutter 330 to form a folded-back portion 333. Thus, the flexible shutter 330 is coupled with the open-close shutter 350. The case 210 has a groove 219, and the open-close shutter 350 is fitted into the groove 219.

A lower end portion of the open-close shutter 350 has a hanger 355 that is bent in an L-shape. The tensile unit 370 is an expansion and contraction member formed of an elastic member such as a spring. One end of the tensile unit 370 is hung on the hanger 355, and the other end of the tensile unit

370 is hung on a support 371 disposed on the case 210. The hanger 355 is vertically movable in a range of length of a slit hole 397.

The first communication portion 391 is a channel that communicates with the first channel and the second channel in a case where the collection unit 100 is attached. The second communication portion 393 is an opening that communicates with the first channel and the second channel in a case where the collection unit 100 is detached. The second communication portion 393 is formed by the slit hole 397 and an opening 399 such that the air flows.

The auxiliary filter 270 is disposed such that not only the air passing through the second communication portion 393 can be processed, but also an area in which the tensile unit 370 expands and contracts can be provided. The auxiliary filter 270 may be disposed to cover the opening 399.

Figure 7:
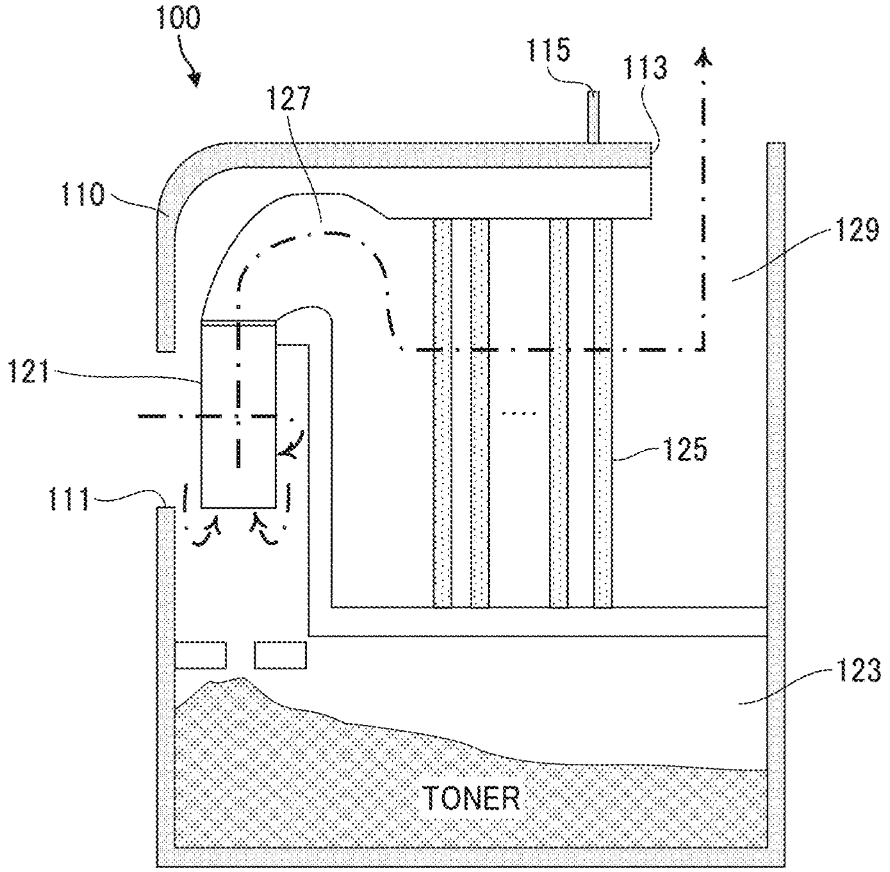
FIG. 7 is a schematic view illustrating a configuration example of the collection unit.

Herein, a description is given of one example of the collection unit 100 detachable from the accommodation portion 215 of the channel switching device 200 according to the present embodiment. FIG. 7 is a schematic diagram illustrating a configuration example of the collection unit 100. The collection unit 100, for example, includes a case 110 formed in a substantially cuboid shape, and the case 110 has an inflow port 111, an outflow port 113, and a pressing rib 115. The collection unit 100 includes a separator 121, a reservoir 123, a filter unit 125, and channels 127 and 129 that are disposed inside the case 110.

The inflow port 111 is an opening into which the air from the first communication portion 391 of the channel switching device 200 flows. The outflow port 113 is an opening from which the air from the collection unit 100 to an auxiliary duct of the channel switching device 200 flows out.

The pressing rib 115 contacts the slide plate 310 to cause the slide plate 310 to slide when the collection unit 100 is attached to the channel switching device 200. The pressing rib 115 includes a fitting portion such as leaf spring such that the fitting portion is fitted into an end portion of the slide plate 310 when the collection unit 100 is attached, and the fitting portion is separated from the slide plate 310 when the collection unit 100 is detached.

The separator 121 separates toner from the air which has flowed in from the inflow port 111. The separator 121, for example, is formed in a cylindrical shape and disposed such that an axial direction of the separator 121 and a vertical direction match each other. The reservoir 123 stores the toner separated by the separator 121. The filter unit 125 includes a filter that cleans the air flowing from the separator 121. The filter unit 125 may include a plurality of types of filters, for example, a toner dustproof filter that filters toner remaining in the air, and an ozone catalyst filter that eliminates ozone. The channel 127 guides the air which has flowed out from the separator 121 to the filter unit 125, whereas the channel 129 guides the air which has flowed out from the filter unit 125 to the outflow port 113. The filter unit 125 may also be referred simply as a “filter 125”.

The separator 121 causes the air introduced inside from a lower portion of the cylindrical shape to swirl to separate toner. The separated toner drops under its own weight and is accumulated in the reservoir 123. When the collection unit 100 is detached, the accumulated toner is collected. The filter unit 125 cleans the air which has flowed in via the channel 127, and expels the cleaned air from the outflow port 113 via the channel 129. A detailed description of the collection unit 100 is omitted herein. The channel switching device 200 according to the present embodiment can employ, for example, a unit that executes a function such as collecting scattered toner or ozone generated in a development device or a transfer device and separating collected toner or ozone by a collection device. The separated toner or ozone is recovered in a reservoir, and toner or ozone that cannot be separated is collected by a filter.

Figure 8:
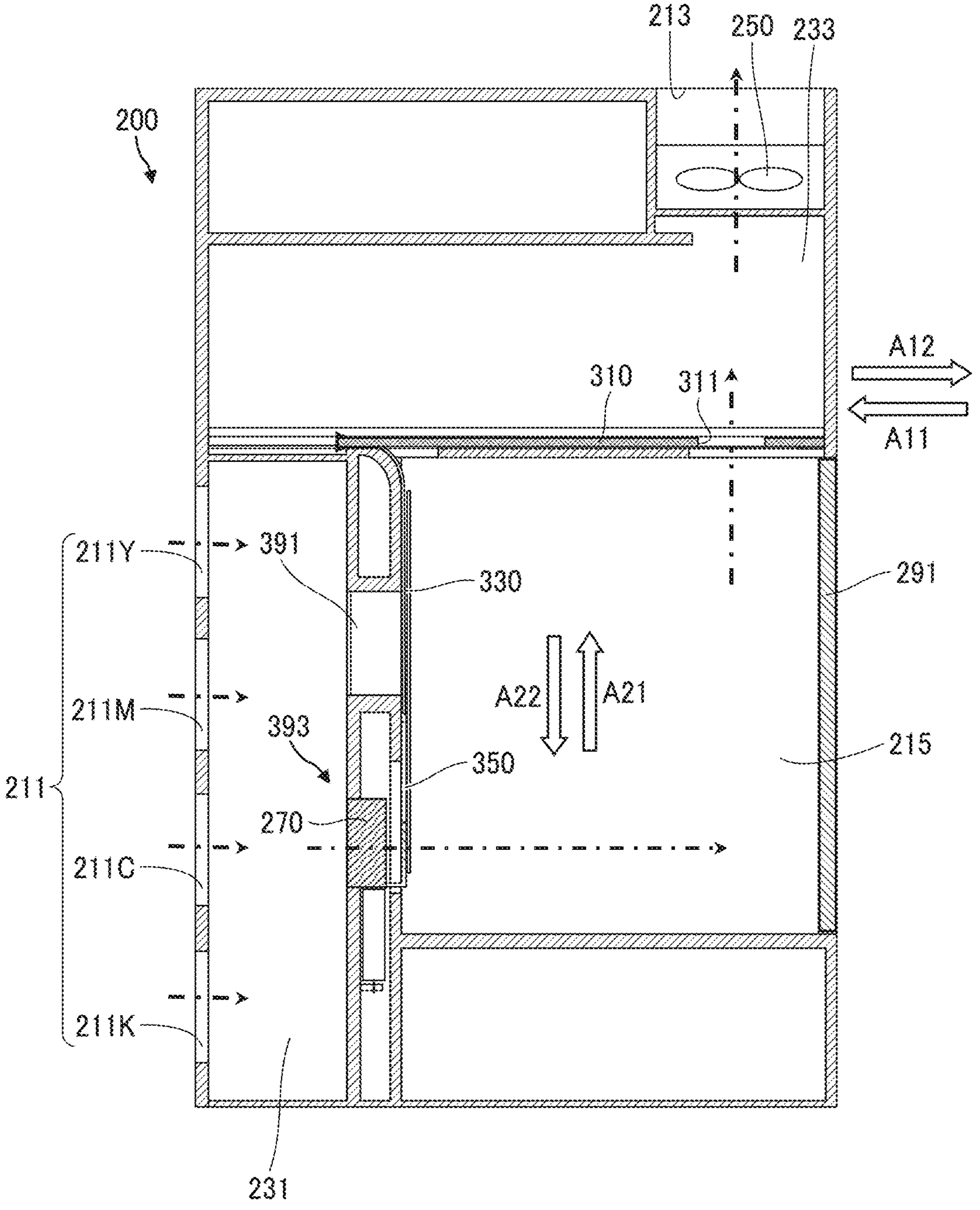
FIG. 8 is a sectional view of the channel switching device taken along the line VIII-VIII of FIG. 3.
Figure 9:
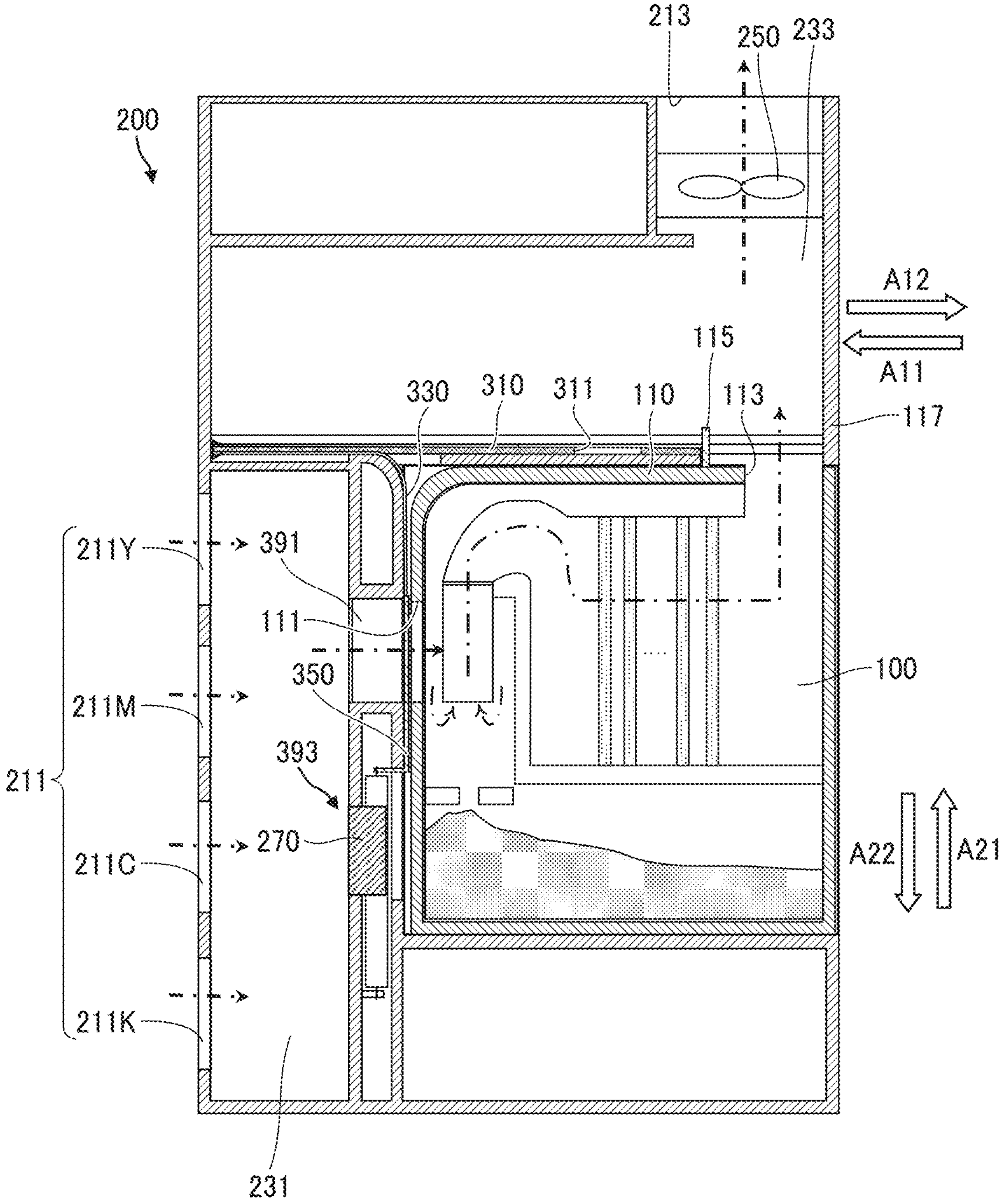
FIG. 9 is a sectional view illustrating an example of a state in which the collection unit is attached to the channel switching device illustrated in FIG. 8.

Next, an example of an operation performed by the switch 300 when the collection unit 100 is attached to or detached from the accommodation portion 215 of the channel switching device 200 is described with reference to FIGS. 3, 4, 8, and 9. FIG. 8 is a sectional view of the channel switching device 200 taken along the line VIII-VIII of FIG. 3. FIG. 9 is a sectional view illustrating an example of a state in which the collection unit 100 is attached to the channel switching device 200 illustrated in FIG. 8. In each of FIGS. 8 and 9, a dot-dashed line indicates a flow of the air. In FIG. 9, each of components inside the case 110 of the collection unit 100 is omitted.

When the Collection Unit 100 is Detached

When the collection unit 100 is detached from the channel switching device 200, a state illustrated in FIG. 4 or 9 shifts to a state illustrated in FIG. 3 or 8. Particularly, the slide plate 310 moves in a direction indicated by an arrow A12 illustrated in FIG. 8. Moreover, the flexible shutter 330 and the open-close shutter 350 are pulled and moved in a direction indicated by an arrow A22 illustrated in FIG. 8 by the tensile unit 370.

If a state shifts to the state illustrated in FIG. 3 or 8, the first communication portion 391 is blocked by the flexible shutter 330 and becomes closed. Meanwhile, the detachment of the collection unit 100 enables the air to pass via the slit hole 397 and the opening 399, so that the second communication portion 393 communicates with the first channel and the second channel. Moreover, the air passes between the accommodation portion 215 and the common duct 233 by using the hole 311 in the slide plate 310. Furthermore, the door 291 is closed and becomes an outer wall of the case 210.

Accordingly, in a state in which the collection unit 100 is detached, the air which has introduced from the introduction portion 211 passes through the second communication portion 393 via the auxiliary filter 270 from the first duct 231 and is guided to the accommodation portion 215. Then, the air passes through the common duct 233 and is discharged to the exit 213.

When the Collection Unit 100 is Attached

When the collection unit 100 is attached to the channel switching device 200, a state illustrated in FIG. 3 or 8 shifts to the state illustrated in FIG. 4 or 9. Particularly, when the collection unit 100 is accommodated in the accommodation portion 215, the slide plate 310 is pushed and moved in a direction indicated by an arrow A11 illustrated in FIG. 9 by the pressing rib 115 disposed to the collection unit 100. Moreover, with such a slide movement of the slide plate 310, the flexible shutter 330 and the open-close shutter 350 are pulled and moved in a direction indicated by an arrow A21 illustrated in FIG. 9.

If a state shifts to the state illustrated in FIG. 4 or 9, the first communication portion 391 is opened by the opening 351 disposed to the open-close shutter 350, and communicates with the first channel and the second channel. Moreover, a portion between the accommodation portion 215 and the common duct 233 is opened by the movement of the slide plate 310. On the other hand, in the second communication portion 393, a flow of the air between the slit hole 397 and the opening 399 is stopped by the attached collection unit 100.

Accordingly, in the state in which the collection unit 100 is attached, the air which has introduced from the introduction portion 211 passes through the first communication portion 391 from the first duct 231, and is guided to the collection unit 100. Then, the air passes through the common duct 233 and is discharged to the exit 213.

As described above, the switch 300 is configured such that the flexible shutter 330 moves along the guide wall 395, and the open-close shutter 350 slides along the groove 219 if the slide plate 310 slides. With the slide movement of the slide plate 310, the first communication portion 391 is closed and opened by the movement of the open-close shutter 350.

In the channel switching device 200 according to the present embodiment, therefore, any of the first communication portion 391 and the second communication portion 393 communicates with a first channel and a second channel in response to a slide movement of the slide plate 310 in association with attachment or detachment of the collection unit 100. Thus, the channel switching device 200 disposed in the image forming apparatus 1 as a main apparatus that switches between a channel that passes through the collection unit 100 and a channel that passes through the auxiliary filter 270.

Figure 10:
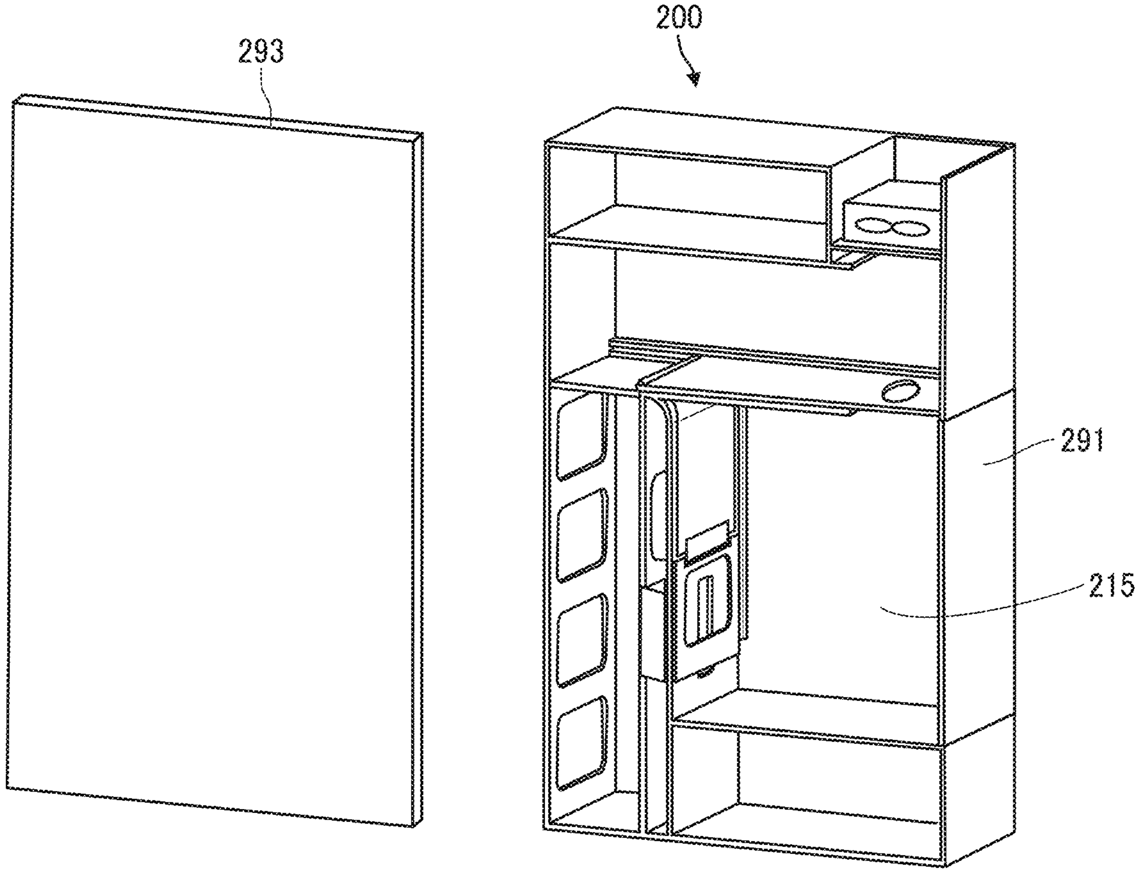
FIG. 10 is a diagram illustrating an example of a state before a cover is attached to the channel switching device illustrated in FIG. 3.
Figure 11:
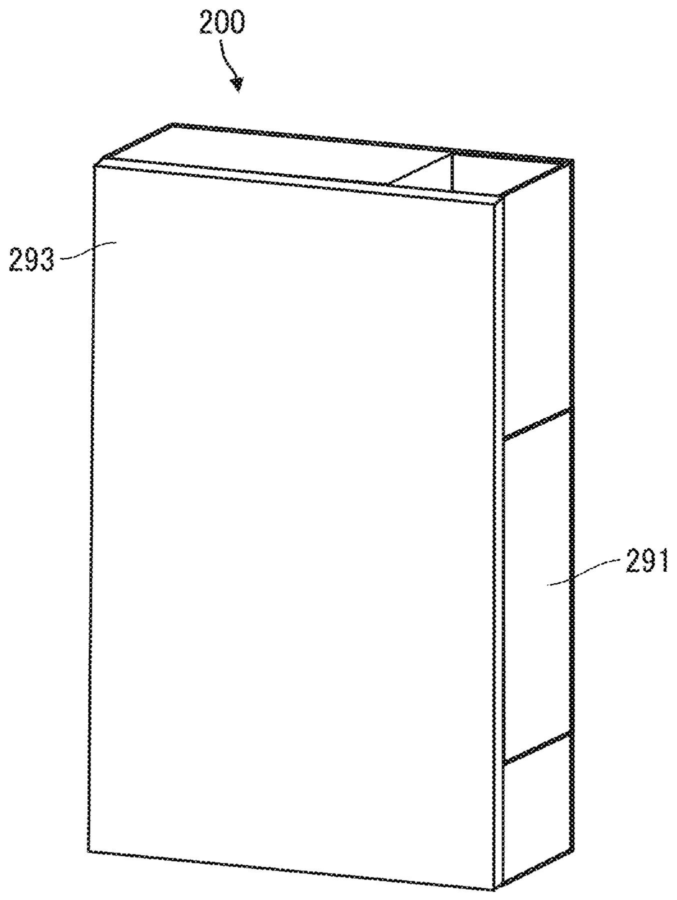
FIG. 11 is a diagram illustrating an example of a state after the cover is attached to the channel switching device illustrated in FIG. 3.

A cover 293 is attached to the channel switching device 200 as illustrated in FIGS. 10 and 11, so that the final form of the channel switching device 200 is provided. FIG. 10 is a diagram illustrating an example of a state before the cover 293 is attached to the channel switching device 200. FIG. 11 is a diagram illustrating an example of a state after the cover 293 is attached to the channel switching device 200 illustrated in FIG. 3. The cover 293 may be configured to be one portion of an external wall surface of the image forming apparatus 1.

As for the channel switching device 200 as illustrated in FIGS. 10 and 11, when the collection unit 100 is detached, the accommodation portion 215 is surrounded by the cover 293 and the door 291, and a channel from the second communication portion 393 to the hole 311 of the slide plate 310 is formed. The above embodiment has been described using an example in which the slide plate 310 is a rectangular plate on which the hole 311 is formed. However, the slide plate 310 is not limited thereto. The slide plate 310, for example, may have a shape having a recessed portion (a cut-out) to form a clearance between the slide plate 310 and the cover 293. Alternatively, the slide plate 310 may be configured such that a clearance can be provided between the slide plate 310 and the case 210 in an area in which the slide plate 310 slides (a movement area in the direction indicated by the arrow A12 in each of FIGS. 8 and 9).

In the above-described embodiment, the channel switching device 200 is preferably configured to be detachable from the image forming apparatus 1.

According to the channel switching device 200 of the present embodiment, in a case where the collection unit 100 is detached from the channel switching device 200 disposed in the image forming apparatus 1, a communication portion is automatically switched from the first communication portion 391 to the second communication portion 393, and thus a first channel and a second channel communicate with each other via an auxiliary unit (the auxiliary filter 270) that assists a function of the collection unit 100. Accordingly, the collection unit 100 can be replaced not only without degrading quality of the air to be discharged from the apparatus but also without temporality stopping an operation (without lowering productivity) of the image forming apparatus 1.

For example, an airflow channel toward a first filter and an airflow channel toward a second filter are electrically switched by a switching device to reduce degradation in a cooling effect. In the channel switching device 200 according to the present embodiment, on the other hand, channels can be simply switched by a mechanical operation of detachment and attachment of the collection unit 100 instead of using an electrical component (e.g., a motor, a clutch, a sensor, and a substrate) or control related to switching, so that a malfunction of the electrical component or the control can be prevented.

In addition, the use of the channel switching device 200 according to the present embodiment can prevent an increase in costs by arrangement of an electrical switching device (e.g., a motor, a clutch, and a sensor) or can reduce labor or costs for assurance of control reliability with respect to the frequency of channel changes due to filter dirtiness.

Moreover, according to the channel switching device 200 of the present embodiment, air-exhaustion-related functions including the collection unit 100 and an airflow switching device are integrated as the channel switching device 200, and the channel switching device 200 is detachable from the image forming apparatus 1. Thus, an inside of an air exhaustion unit (a duct) can be readily cleaned (cleanability can be enhanced) without removal of, for example, an exterior of the image forming apparatus 1.

Each of the above embodiments has been described using the collection unit 100 as a unit that is detachably disposed in the channel switching device 200. However, the unit is not limited thereto. A unit that performs a process for separating or removing an optional substance from the air may be used. In such a case, the process to be performed by the unit can be supplemented by an auxiliary unit instead of the unit. The use of the unit is not limited to the removal of an optional substance from the air. A unit that mixes or adds an optional substance to the air may be employed.

The channel switching device 200 has been described using an example of a configuration including the fan 250 as an air blower. However, the channel switching device 200 is not limited thereto. For example, an air blower may be disposed in an apparatus body in which the channel switching device 200 of the present embodiment is disposed. In such a case, a flow of the air may be generated by the channel switching device 200.

The embodiment has been described using a configuration example in which the channel switching device 200 is used in the image forming apparatus 1. However, the embodiment is not limited thereto. A main apparatus that uses the channel switching device 200 of the present embodiment is not limited to the above-described image forming apparatus 1. The channel switching device 200 of the present embodiment may be used in a liquid discharge apparatus such as an inkjet apparatus that discharges a liquid. In a case of the inkjet apparatus, since liquid discharged from a recording head floats as mist, a collection unit that collects floating mist can be used as a unit detachable from the channel switching device 200. Thus, the liquid discharge apparatus such as the inkjet apparatus may be used as an example of the image forming apparatus 1.

Figure 12:
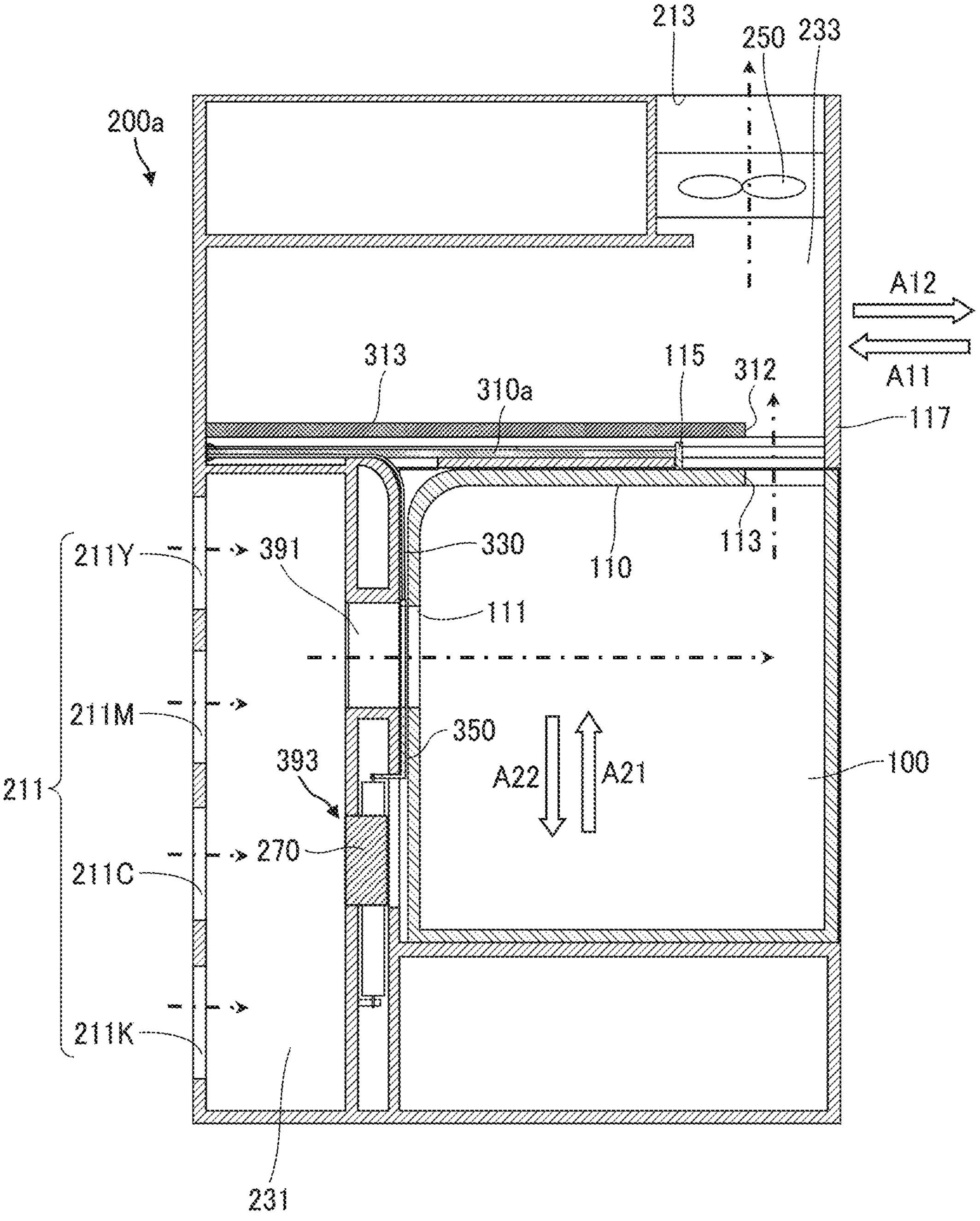
FIG. 12 is a diagram illustrating a modification of the slide plate.

In the aforementioned example, a configuration example in which the hole 311 is formed on the slide plate 310 has been described. However, the example is not limited thereto. FIG. 12 is a diagram illustrating a modification of the slide plate. For example, as illustrated in FIG. 12, a channel switching device 200*a* can include a plate (a secured plate)

313 the position of which is secured above a slide plate 310*a* such that a hole 311 is not formed on the slide plate 310*a*. In the example illustrated in FIG. 12, an opening 312 is formed between a right end of the slide plate 310*a* and a duct auxiliary wall 117. Unlike the above-described example, a length of the slide plate 310*a* in a lateral width direction is short. In addition, the right end of the slide plate 310*a* is positioned such that the opening 312 is opened when the collection unit 100 is not attached.

The present embodiment has been described above with reference to specific embodiment but is not limited thereto. It is apparent to one skilled in the art that various modifications and enhancements are possible without departing from scope of the disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A channel switching device comprising:

an accommodation portion in which a unit is detachably accommodated;

a first air channel;

a second air channel passing through the accommodation portion; and a switch separating the first air channel and the second air channel, the switch including:

a first communication portion communicating with the first air channel and the second air channel; and a second communication portion disposed at a different position than a position of the first communication portion, the second communication portion communicating with the first air channel and the second air channel, and the switch to switch to one of the first communication portion or the second communication portion in response to an attachment or detachment of the unit to the accommodation portion.

2. The channel switching device according to claim 1, wherein the switch includes a slide plate to slide in response to the attachment and the detachment of the unit to the accommodation portion.

3. The channel switching device according to claim 2, wherein the switch switches to one of opening or closing of the first communication portion in response to a slide movement of the slide plate.

4. The channel switching device according to claim 3, wherein the switch slidably moves the slide plate to open the first communication portion and close the second communication portion in response to the attachment of the unit to the accommodation portion to cause the first air channel to communicate with the second air channel via the unit in the accommodation portion.

5. The channel switching device according to claim 3, wherein the second communication portion includes an auxiliary filter; and the switch slidably moves the slide plate to close the first communication portion and open the second communication portion in response to the detachment of the unit from the accommodation portion to cause the first air channel to communicate with the second air channel via the auxiliary filter.

6. The channel switching device according to claim 1, further comprising:

a door to be openably closed in response to the attachment or the detachment of the unit to the accommodation portion, wherein the door closes the accommodation portion in response to the detachment of the unit from the accommodation portion.

7. The channel switching device according to claim 1, wherein the unit includes a filter to collect a predetermined substance.

8. The channel switching device according to claim 1, further comprising an air blower to generate airflow from the first air channel to the second air channel.

9. An image forming apparatus comprising the channel switching device according to claim 1.

* * * * *